May 30, 1933. C. H. A. F. L. ROSS Re. 18,853

FLUID REACTIVE SURFACE

Original Filed April 21, 1931 3 Sheets-Sheet 1

Inventor

CHARLES H. A. F. L. ROSS,

By Semmes & Semmes

Attorneys

FLUID REACTIVE SURFACE

Original Filed April 21, 1931 3 Sheets-Sheet 2

Inventor

CHARLES H. A. F. L. ROSS,

By Semmes & Semmes

Attorneys

FLUID REACTIVE SURFACE

Original Filed April 21, 1931 3 Sheets-Sheet 3

Inventor

CHARLES H. A. F. L. ROSS,

By Sommers & Sommers

Attorneys

Reissued May 30, 1933

Re. 18,853

UNITED STATES PATENT OFFICE

CHARLES H. A. F. L. ROSS, OF WASHINGTON, DISTRICT OF COLUMBIA

FLUID REACTIVE SURFACE

Original No. 1,882,163, dated October 11, 1932, Serial No. 531,784, filed April 21, 1931. Application for reissue filed April 12, 1933. Serial No. 665,646.

This invention relates to fluid reactive surfaces.

One particular application of the invention is its use in marine propellers of the screw type, although the invention is broadly susceptible of use in turbines, fans, aeroplane propellers, fluid driven devices such as wind mills, and, in general, any device having a surface or surfaces driving, or being driven by, a fluid.

In shipbuilding practice, the screw propeller dominates the field of propulsion devices for self-propelled ships, and its use is practically universal on ocean-going steamers. The use of the more cumbersome paddle wheels has been restricted to the relatively small ships on inland waters. Yet, while the screw propeller has a number of constructional advantages, it has been, as previously made, a relatively inefficient device, and wastes at least forty per cent of the power delivered to it by the driving engines.

In spite of the decided improvements in recent years in other parts of the driving mechanism, such as the use of steam turbines, the use of oil as fuel, etc., the screw propeller has remained a wasteful device. Such improvements as were made therein were largely the result of empirical or "cut and try" methods, and in some cases, the result of accidental discoveries. A typical example is the reduction in the number of the blades, which resulted from the observation that a steamer driven by a six-bladed propeller actually went faster after one of the blades was accidentally lost. Other developments were changes in area of the blades, contour or shape of the blades, etc., made with the hope of producing a more efficient propeller.

About the time when increased speeds were beginning to be used in steamers, it was noticed that there was a rapid loss of efficiency in the screw propellers at the higher speeds of rotation. This led to the pronouncement of the cavitation theory by Mr. Sidney W. Barnaby. This theory attributes the increased loss of efficiency to the "cavity" produced about the propeller after it reaches a certain speed, because of the inability of the fluid to flow fast enough to follow the blade. To avoid this effect, the use of a propeller with larger area was recommended.

Despite all these developments, however, the screw propeller has remained a relatively inefficient device. This is due, it is believed, to the ignoring of a fundamental factor in the manufacture of propellers. To fully understand this factor, a consideration of what I term the "wart" theory is necessary. It may be stated at the outset, however, that this theory is based upon an extensive study and observation of the action of propellers, and that the change of construction based thereon has resulted in an increased efficiency of some twenty-five to thirty per cent.

In present practice, the finished propeller is not required to be accurate within certain limits, and apparently the only requirement in this respect is that the surfaces of the blades look satisfactorily smooth to the eye. The industry seems to have accepted the conclusion that the screw propeller is inherently inefficient and that refinements in the accuracy of the surface are a mere waste of time.

In present propellers, therefore, even of the best grade, there exists inequalities in the surfaces, such as lumps or "warts". These form high spots and corresponding valleys in the surface, and have been found to have a decided effect upon the efficiency of the propeller. It is believed that when the propeller is driven at its usual speed, the water hits only these high spots, and skips past the valleys. The water does not follow the blade, and a decided loss in efficiency consequently results. The action may be compared to a solid tired automobile passing over a rough road at high speed, causing the driving wheels to be repeatedly in the air. During such times, the power delivered to the wheels is entirely lost, so far as propelling the vehicle is concerned, and the efficiency of the automobile is greatly reduced.

In view of this it is apparent that the accurate machining of the blades to form a smooth surface free from such "warts" produces an increased efficiency of the propeller. In actual practice, this increase is found to be not a mere minor increase such as might be expected from more accurate methods, but the unexpected result of an increase of some twenty-five to thirty per cent in efficiency.

The abolition of the turbulence arising from warts promotes the maintenance of the original even surface. In addition, the smooth passage of the water over such a surface so greatly reduced vibration that it becomes inappreciable, and this further increases the relative efficiency of the propeller.

The term "warts" or "wartless" is one which I have employed in connection with the description of my propeller both in this specification and in scientific papers which I have written. Possibly phraseology which would be of more universal acceptance would be to say that the drunkenness of the pitch in propellers has been eliminated. Elimination of drunkenness in pitch is equivalent to saying that the propeller is "wartless", and where I use the term "wartless", or phraseology denoting elimination of drunkenness in the pitch throughout this specification and the claims, I intend to convey the same thought. My authority for using the term "drunken" is to be found in the Encyclopedia Brittanica, 11th edition, volume 24, page 481.

It is accordingly a major purpose of my invention to provide a propeller of increased relative efficiency.

It is another object of my invention to provide a propeller having accurately machined blade surfaces.

It is a further object of my invention to provide a propeller having the surfaces of its blades approaching their theoretical true surfaces within a tolerance of ± .003 inch.

It is another object of my invention to provide a propeller having reduced vibration.

It is a further object of my invention to provide a propeller, the surfaces of which will maintain their original shape and surface.

It is a still further object of my invention to provide a method of producing a propeller of the type set forth in the above paragraphs.

As indicated above, my invention is susceptible of uses in aeroplane propellers or other propellers acting on a gaseous medium; in turbines, driven either by a liquid or a gas; in fans or blowers driving a gaseous medium; in devices driven by a fluid medium such as wind mills; or, in fact, any device having a moving surface cooperating with a fluid. Accordingly, while I show particularly in this specification a marine screw propeller as the means for carrying my invention into practical effect, I do not limit myself to this particular construction, which for purposes of explanation, has been made the subject of illustration.

It is accordingly a further and broader object of my invention to increase the efficiency of surfaces used in coaction with a fluid medium.

With these and other objects in view, which may be incident to my improvements, the invention consists in the parts, combinations, and methods hereinafter set forth, with the understanding that variations therein may be carried out without departing from the spirit of the invention or the scope of the appended claims.

Figure 1:
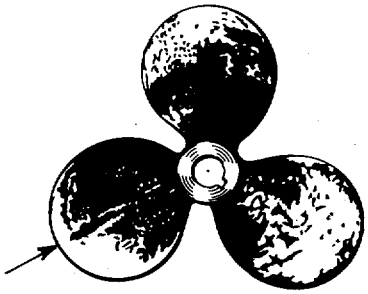
Figure 1 is the representation of a propeller tested in the investigation.

Figure 1 shows the results of a test made on a good grade of propeller of the type now produced. The blades of this propeller were painted with black paint, and the propeller was then used in actual service. This figure shows how the paint was worn, the white portions on the blades being the metal surfaces from which the friction of the water removed the paint. As is indicated, the paint is not worn off smoothly, but is worn off at numerous "high spots" on the blade. About the middle of one of the blades, indicated by the arrow, there is a radially extending "valley" practically unacted upon. The test conclusively showed the presence of the "warts" or high spots discussed in an earlier part of this specification, and shows that the water, in passing over such a surface, merely hits the high spots. Thus, the water is impelled by a succession of sudden bumps, rather than by a smooth impelling action.

The bumping action just referred to undoubtedly causes vibration of the propeller and this vibration in turn increases the bumpiness, causing a vicious circle which, it is believed, causes the relatively low efficiency of the screw propeller as now made. With a propeller made in accordance with the present invention, aside from the marked increase in efficiency, there is a decided reduction in vibration, which in itself causes a more efficient action of the propelling mechanism, as well as materially increasing the life and dependability thereof.

Figure 2:
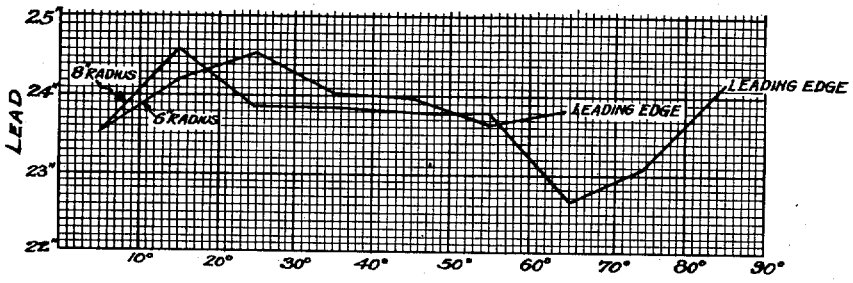
Figure 2 is the graph of the variation in lead at various portions of the surface of a propeller of good grade.
Figure 3:
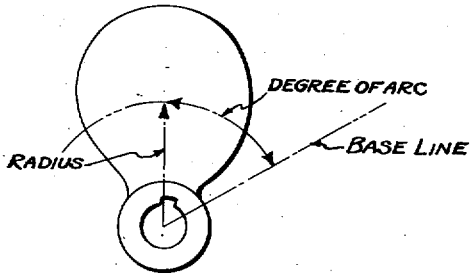
Figure 3 is a diagrammatic sketch showing how the various points plotted were measured.

There is another result from the lack of mechanical accuracy in finishing the blades, and this is the wide variation in the lead as determined from various points of the blade. Theoretically, the surfaces of the typical screw propeller is helical, with a certain definite lead. With even the best type of present propeller, however, the lead, as calculated from various points of the surface, varies greatly. Figure 2 is a graph indicating such variations, and Figure 3 shows how the various points were determined. To draw the graph for the points on the three inch radius, the points are determined as being a certain number of degrees from the "base line", which degrees are plotted as abscissæ, and the various leads found for these points respectively, are plotted as ordinates. The graph shows that there is no definitely fixed lead, or any definite variable lead bearing a continuous relation to a helical surface. The lead on the propeller graphed is merely a hit or miss value varying from about twenty-two and one-half inches to twenty-four and one-half inches. Such variations mean that the water is impelled at different rates at different parts of the surface, and such action unquestionably causes eddies and other undesirable effects, and decidedly reduces the efficiency of the propeller.

Figure 4:
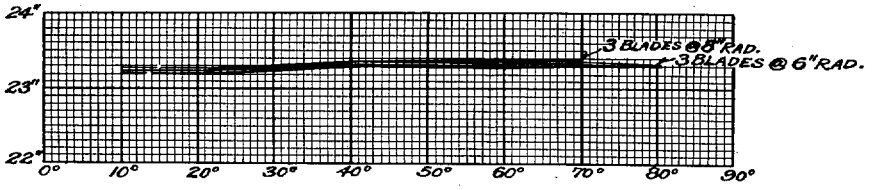
Figure 4 is a corresponding graph of the surfaces of a propeller produced in accordance with my invention.

Figure 4 shows a corresponding diagram of a propeller made according to my invention, and the uniform lead thereof, resulting in a uniform and steady impulsion, is apparent from the diagram.

My invention contemplates broadly the utilization of a wartless surface in contact with a fluid and is not limited to strictly helical surfaces. For instance, it is possible that I may want to vary the pitch of a propeller, and construct blades in which the pitch does vary throughout its extent. If I desire to vary the pitch, for instance of a propeller blade, I at least want the variation to be in accordance with the specification, and I do want the blade to be wartless. In one form of my invention as applied to a propeller blade, I may desire that the blade represent a true helicoidal surface in which the pitch of the propelling surface is constant throughout its extent as shown in Figure 4. I mention this last type of propeller blade simply as desirable under certain conditions, but do not wish to be limited to this type of blade, only, so long as the blade presents a wartless surface. For instance, I may want to change the lead of the blade gradually from say 22″ to 24″, but I want this change to occur without the appearance of warty surfaces. Such gradual increase may be a gradual increase radially, arcuately, or both, or other types of surfaces may be used, provided they are smooth, even, and wartless. The propeller blade therefore in which the surface throughout is wartless, and truly helicoidal comprises but one of the innumerable modifications of a wartless surface, which my method of construction contemplates.

Figure 5:
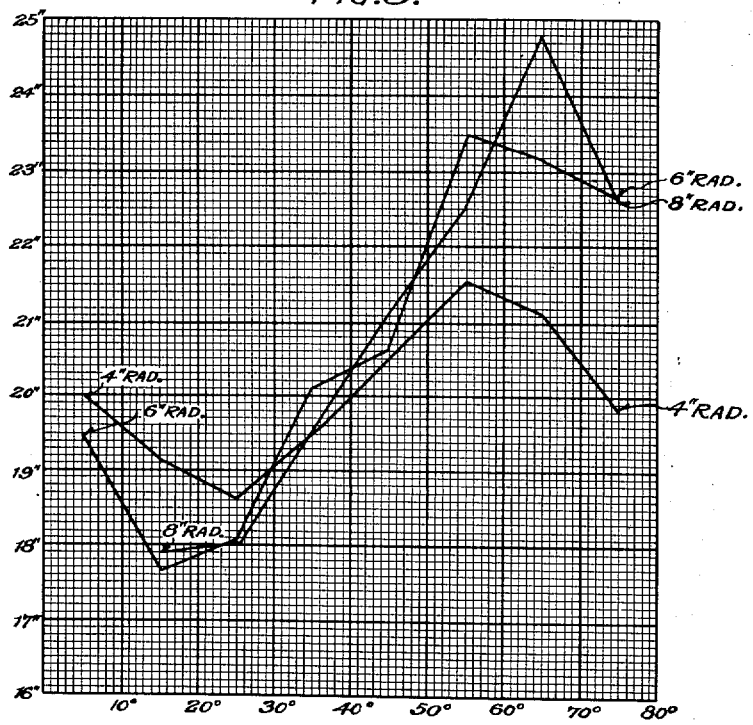
Figure 5 is a graph of the variation in lead at various portions of the surface of another type of propeller.

Figure 5 shows a graph of the lead obtained for various points on a present commercial propeller which is extended to have an arcuately increasing lead. As is evident from the graph, the actual measurements depart from the desired amounts, and produce the warty surface described above.

Figure 6:
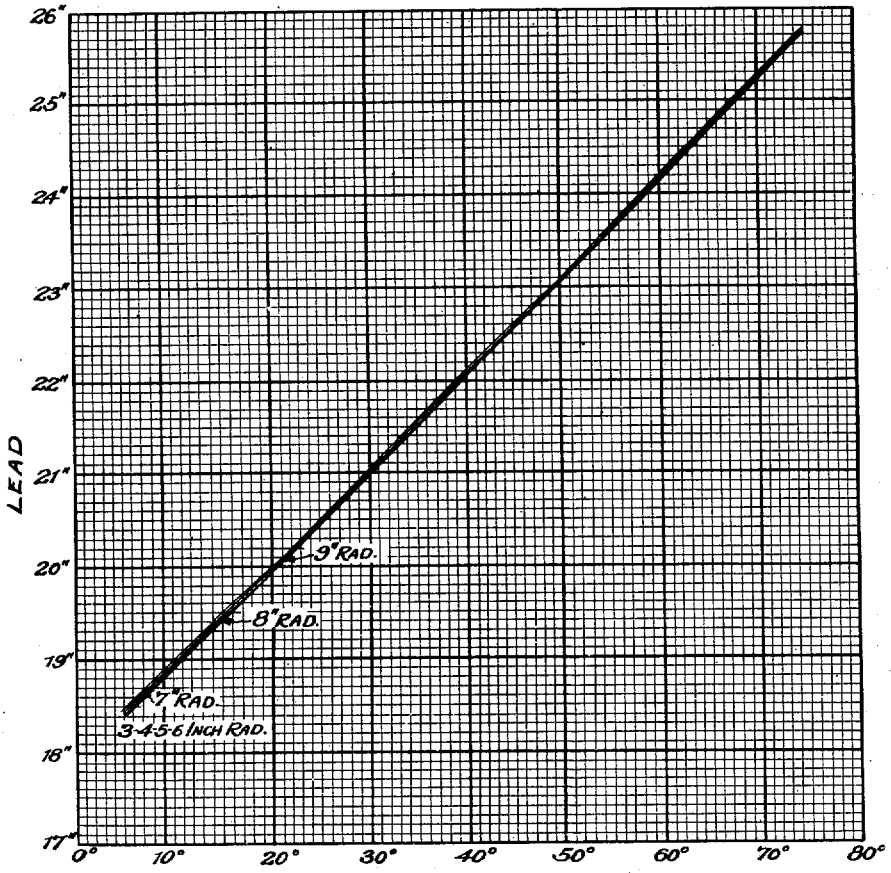
Figure 6 is a corresponding graph of the surfaces of a similar propeller produced in accordance with my invention.

Figure 6 shows a graph of a similar type of propeller, but constructed according to my invention and having a wartless surface. It will be noted that although the lead varies, it varies uniformly according to a desired rate, and presents an even, smooth, wartless surface.

Thus it is apparent that the basic feature of my invention is the provision of a regular, even, smooth surface for the blades of a propeller, and a surface which follows, as accurately as possible, the theoretical surface desired. Such a surface I term a wartless surface, and a propeller having such surfaces, a wartless propeller. Both the face and back surfaces of the blades should be such wartless surfaces.

To provide such a surface, I use a profile grinder of the type disclosed in my application Serial No. 501,155, filed December 8, 1930, and my application Serial No. 517,566, filed February 21, 1931. It is to be understood that those disclosures are hereby made a part of the disclosure of this present application. By such machines, the production of a smooth, uniform, wartless surface may easily be produced by one skilled in the art. Such machines are capable of producing propellers accurate to within ± .003 inch.

The propellers made by such machines have the wartless surface described above, and have the desired lead at all points of the surface of their blade. If desired, by the use of suitable templates, any desired type of surface may be produced on the blades, and such surface will approach the desired theoretical surface to within ± .003 inch.

Figure 7:
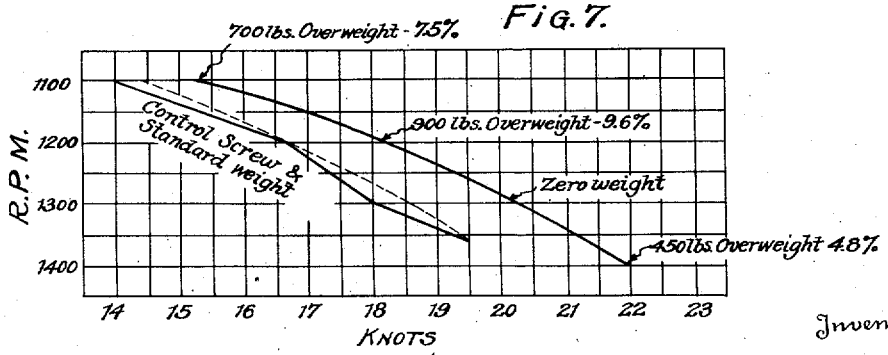
Figure 7 is a diagram showing the results of a test of a propeller embodying my invention.

In actual trial, one of the wartless propellers was tested against an otherwise similar "control" propeller of the best grade obtainable. The results of these tests are shown in Figure 7, knots per hour being plotted against revolutions per minute. The superiority of the wartless propeller is apparent. In addition, the wartless propeller imparted from 20% to 30% more thrust to the boat than the control propeller, and vibration was completely eliminated by its use. Since the propellers were similar, except for the wartless surface, the advantages of my invention are apparent.

As previously pointed out, my invention is obviously susceptible of use in other devices wherein a surface coacts with a fluid.

While I have shown and described the preferred embodiment of my invention, I wish it to be understood that I do not confine myself to the precise details set forth, by way of illustration, as it is apparent that changes, variations therein and other applications thereof may be made by those skilled in the art, without departing from the spirit of the invention, or exceeding the scope of the claims.

I claim:

1. A propeller in which the drunkenness of the helical surface is substantially eliminated.

2. A propeller having blades in which the drunkenness of the helical surface is substantially eliminated.

3. A propeller blade whose actual pitch for any point of its surface does not deviate from the desired pitch more than an amount equal to four per cent of the desired pitch.

4. A propeller whose pitch is uniform for all the points of the propelling surfaces of its blades, such uniformity being within limits of four per cent of the desired pitch.

5. A propeller blade having a helicoidal surface in which the lead remains substantially constant and in which the drunkenness of the surface is substantially eliminated.

6. A propeller blade having a helicoidal surface in which the drunkenness of the surface is substantially eliminated.

7. A propeller blade having a surface in which drunkenness is substantially eliminated and whose pitch varies evenly and continuously according to a definite desired rate of change.

In testimony whereof I affix my signature.

CHARLES H. A. F. L. ROSS.